United States Patent [19]
Turner et al.

[11] Patent Number: 5,809,867
[45] Date of Patent: Sep. 22, 1998

[54] INSULATING JACKET FOR PRESS-TYPE COFFEE MAKER

[76] Inventors: Sheila S. Turner, 850 Haverford Ave. #12, Pacific Palisades, Calif. 90265; Elliot Barden, P.O. Box 1665, Pacific Palisades, Calif. 90272-1665

[21] Appl. No.: 931,319

[22] Filed: Sep. 16, 1997

[51] Int. Cl.⁶ .............................. A47J 31/38; B65D 25/34
[52] U.S. Cl. .............................. 99/297; 99/287; 150/901; 220/449
[58] Field of Search .............................. 99/297, 287, 290, 99/279; 206/548, 545; 150/901, 154; 200/449

[56] References Cited

U.S. PATENT DOCUMENTS

| | | | |
|---|---|---|---|
| 2,426,475 | 8/1947 | Van Frank | 150/901 |
| 5,183,183 | 2/1993 | Hernandez | 99/287 X |
| 5,570,623 | 11/1996 | Lin | 99/297 X |
| 5,609,265 | 3/1997 | Haberkorn et al. | 220/449 X |

*Primary Examiner*—Reginald L. Alexander
*Attorney, Agent, or Firm*—Beehler & Pavitt

[57] ABSTRACT

An insulating jacket for a press-type coffee maker (coffee press) is described. A coffee press brews coffee by having ground coffee placed in a heat resistant container (typically glass) and boiling water added. The mixture is allowed to brew for a specified period after which a plunger affixed to the top of the container having a filter screen at the lower end, is pushed downward into the container, separating the coffee grounds from the coffee. Coffee press coffee makers provide a superior flavor, however heat tends to dissipate rapidly from the container. The invention includes an insulating jacket extending from the top end of the coffee press to its base with openings provided for the handle and the spout of the coffee press. A central hole, surrounded with elastic so that it fits tightly around the plunger rod, is provided in the top end of the jacket to permit the plunger of the coffee press to be activated while the jacket is in place. Openable members are provided to secure the jacket about the opening for the handle so as to prevent unnecessary heat loss and to permit visual inspection of the remaining level of coffee. A hinged flap seals the spout opening when the coffee press is placed on is base and swings upwardly from the spout when coffee is poured. The flap may be closed with a magnet to further secure heat within the coffee press. An insulated pad may be provided for use beneath the base of the coffee press which is hingedly attached to the lower perimeter of the jacket.

10 Claims, 2 Drawing Sheets

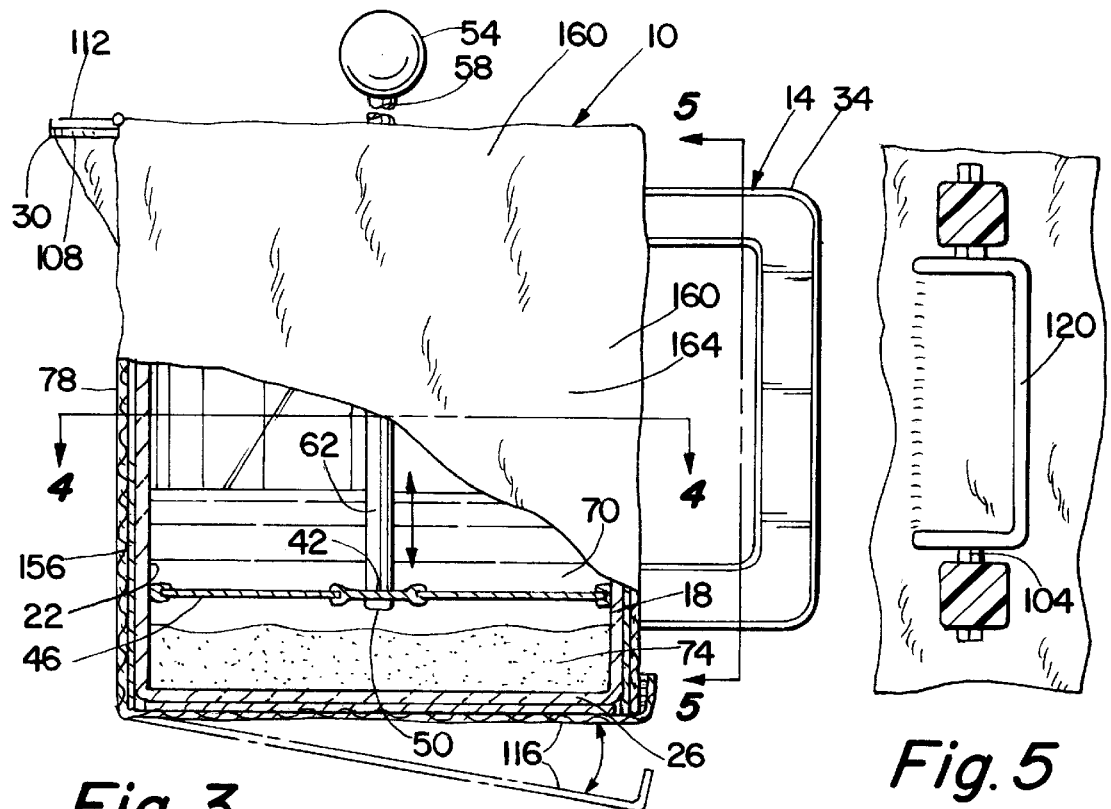
Fig. 3
Fig. 5
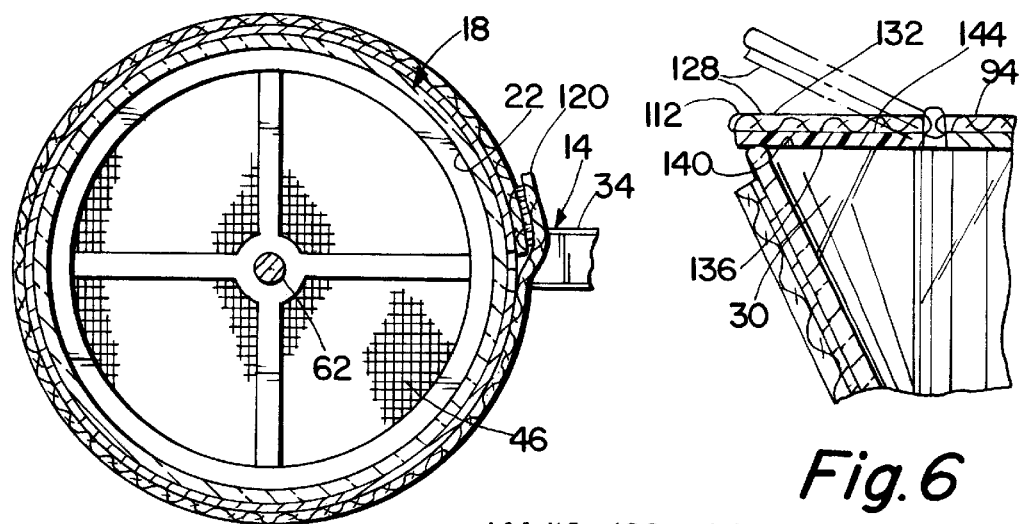
Fig. 4
Fig. 6
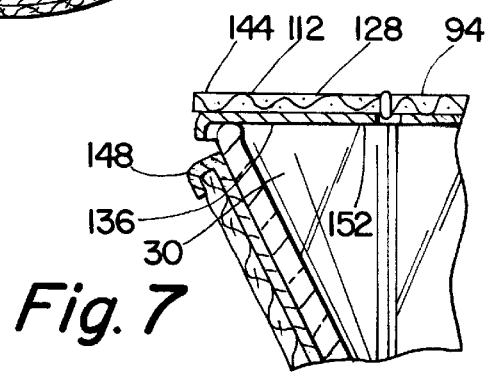
Fig. 7

INSULATING JACKET FOR PRESS-TYPE COFFEE MAKER

FIELD OF INVENTION

The invention pertains to insulating jackets for beverage containers and more particularly to insulating jackets for coffee makers.

BACKGROUND OF THE INVENTION

The French Press or Coffee Press (referred hereinafter as a coffee press) has become a preferred way of brewing coffee among professional coffee tasters and the coffee drinking public in general. The coffee press is a relatively simple device comprising a pitcher (typically made of glass), a lid with a central hole, and a plunger fitted with a fine mesh screen or filter which is operated through the hole in the lid. In use, the ground coffee is placed in the pitcher and boiling water is added. The top is placed on the pitcher with the plunger withdrawn so that the filter is above the grounds and the water, allowing the coffee to brew. After about five minutes, the plunger is pushed down towards the bottom of the pitcher, so that the coffee grounds are separated from the liquid. While the coffee press has the ability to make superior coffee, it has the drawback of allowing the coffee to cool rapidly, thus losing the desired taste and temperature.

The prior art includes a number of inventions directed towards insulating beverage and other liquid containers. U.S. Pat. No. 1,116,932 issued to Schwartz et. al. in 1914 provided for an insulating cover for a hot water bottle, the cover serving both to protect the user from burns and to retain the heat within the bottle. U.S. Pat. No. 1,346,485 issued to Arrigunaga in 1920 describes a device for the preparation of coffee or like beverages incorporating an insulated container with removable insulated cover. The cover of the device includes a plunger device with a screen at the lower end to separate coffee grounds or tea leaves from the brewing liquid. This device is designed to brew a single glass or serving of coffee or similar beverage with the beverage being drunk from the container directly.

U.S. Pat. No. 2,154,772 issued to Rathemacher in 1937 illustrates a bottle holder and protector for maintaining a wine bottle in a chilled condition. The invention is basically an insulating cloth which wraps around the bottle with the neck projecting through a hole in the cloth. U.S. Pat. No. 2,482,322 issued to Cortese in 1947 describes an insulating jacket for a baby bottle which zips or snaps over the feeding bottle. Likewise, U.S. Pat. No. 2,522,381 issued to Kramer in 1948 illustrates a baby bottle insulating bag with a drawstring enclosure.

Of a slightly different nature, U.S. Pat. No. 2,740,544 issued to Vaughan in 1950 relates to a protective cover designed to minimized breakage of glass coffee pots typically used with commercial drip type coffee makers. U.S. Pat. No. 4,197,890 issued to Simko in 1980 describes an insulating jacket for bottles which has a bottom zipper enclosure. Finally, U.S. Pat. No. 5,415,305 issued to Drake-Tipton et al. in 1995 illustrates an insulating sleeve for a beverage pitcher.

It is an objective of this invention to provide a means for maintaining beverages brewed in a coffee press at a desirable drinking temperature. It is a further objective of the invention to provide an insulating cover for a coffee press which can be easily installed and removed. It is yet a further objective of the invention to provide a means for insulating the lid and spout of the coffee press. It is a still further objective of the invention to provide a means to determine the level of beverage remaining within the coffee press.

While many of the desired features of an insulating cover for a coffee press may be found in the prior art, no invention previously known incorporates all of the desired features in an insulating cover for a coffee press which is easy and inexpensive to manufacture and effective and simple to use.

SUMMARY OF THE INVENTION

The invention is an insulating jacket for a coffee press. A coffee press comprises a heat resistant pitcher with a cylindrical inner surface, a closed base, a spout, a handle and a lid fitting the pitcher. The lid includes a plunger having a fine mesh screen at the bottom end and a handle at the top end. The plunger is operated by a rod passing through an orifice in the jacket to separate brewed coffee from coffee grounds in the bottom of the pitcher.

In its simplest form the jacket comprises a fitted sleeve formed of insulating material shaped to conform roughly to the exterior shape of the pitcher. The sleeve includes openings to accommodate the handle and the spout of the coffee press. An insulating top cover is attached to the sleeve at its upper perimeter. The top cover is sized to cover the lid of the coffee press. The top cover includes a central hole sized and located to accommodate the plunger rod of the lid. Means are provided for removably covering the spout of the pitcher.

In its preferred embodiment, the jacket is formed of insulating material shaped to conform roughly to the exterior shape of the coffee press. The jacket has a roughly cylindrical shape with an upper perimeter and a lower perimeter and has a closure at its upper perimeter. The top end of the jacket includes a central hole sized and located to accommodate the plunger rod of the coffee press.

The jacket includes openings to accommodate the handle and the spout of the pitcher. Means are provided for removably covering the spout of the coffee press and for insulating the base of the coffee press.

In a variant of the invention, a means is provided for opening and closing the jacket about the opening for the handle so as to prevent heat loss through the opening. This facility also provides a means to determine the level of coffee remaining in the coffee press.

In another variant of the invention, the opening in the top end of the jacket is surrounded by elastic material so that the opening may be tightly closed about the plunger rod of the lid.

In yet another variant of the preferred embodiment the means for removably covering the spout of the coffee press further comprises a flap shaped to cover the spout of the coffee press. The flap is hingedly attached to the top end of the jacket at its upper perimeter. The flap has a top surface and a bottom surface with the bottom surface located on an upper edge of the spout. The bottom surface of the flap is formed of a non-porous, heat resistant material.

When the coffee press is positioned vertically on its base the flap rests on the upper edge of the spout, thereby closing the spout and preserving heat within the coffee press. When the coffee press is tilted to pour coffee from the pitcher the flap will be displaced upwardly away from the spout by the weight of coffee leaving the pitcher. The top surface of the flap may be formed of insulating material.

In still a further variant of the invention, a strip of lightly magnetized material is affixed to the jacket adjacent an upper edge of the spout and the bottom surface of the flap is formed of material which may be attracted by a magnet. When the coffee press is positioned vertically on its base the flap rests upon the upper edge of the spout and the flap is held in place by magnetic attraction, thereby closing the spout and preserving heat within the coffee press. When the coffee press is tilted to pour coffee from the pitcher, the flap will be displaced upwardly away from the spout by the weight of coffee leaving the pitcher with sufficient force to separate the flap from the top edge of the spout despite the magnetic force attracting the flap to the magnetic strip.

In yet a further variant of the invention a heat-reflecting metallic inner surface is applied to the jacket for maximizing heat retention. In another variant a stain-resistant coating is applied to an outer surface of the jacket. In still another variant, a pad of insulating material is disposed below the base of the coffee press and hingedly attached to the lower perimeter of the jacket.

BRIEF DESCRIPTION OF THE DRAWINGS

FIG. 3 is a side elevation of the closing means about the handle opening of the FIG. 1 embodiment;

FIG. 4 is a cross sectional plan view of the FIG. 1 embodiment taken along line 4—4;

FIG. 5 is a cross sectional side view of FIG. 1 illustrating handle and handle opening closure taken along line 5—5;

FIG. 6 is a cross sectional side view detailing the closure for securing the flap over the spout taken along line 6—6; and FIG. 7 is a cross sectional side view detailing a magnetic closure for securing the flap over the spout taken along line 6—6.

DETAILED DESCRIPTION OF THE PREFERRED EMBODIMENT

Figure 1:
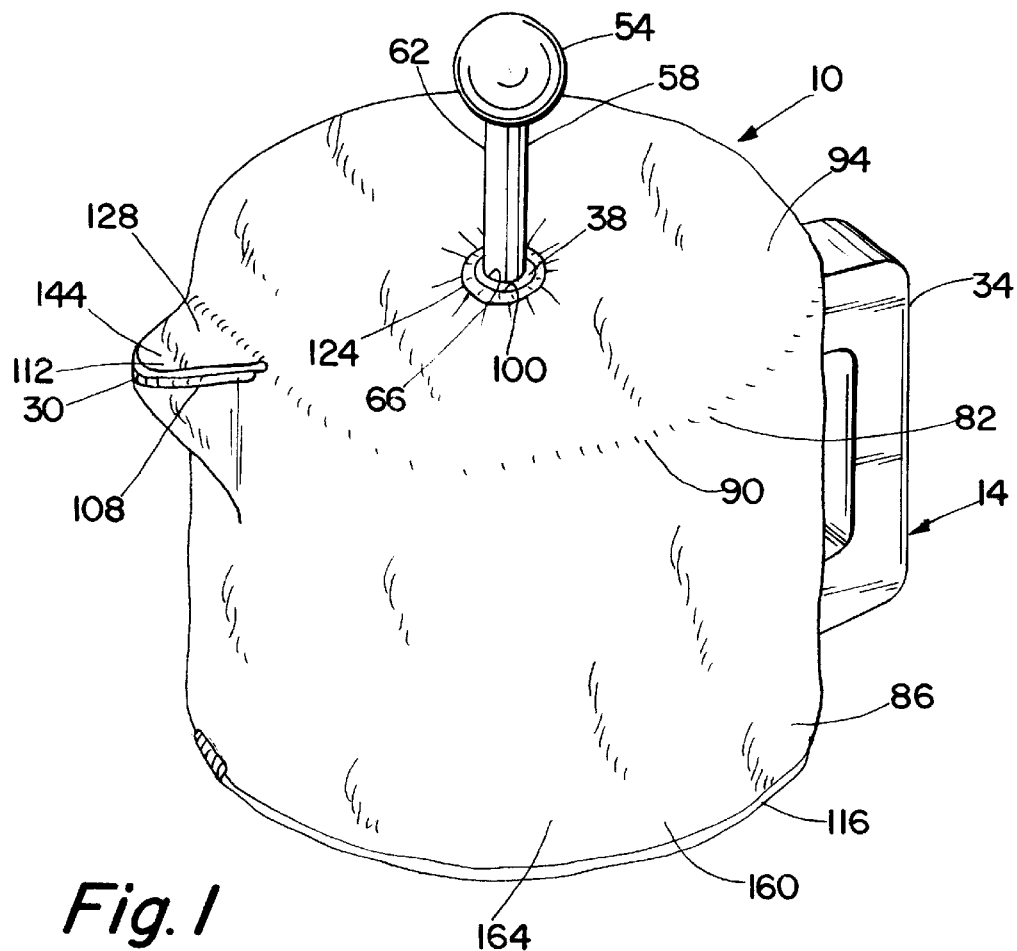
FIG. 1 is a perspective view of the preferred embodiment of the insulating jacket installed on a typical coffee press.
Figure 2:
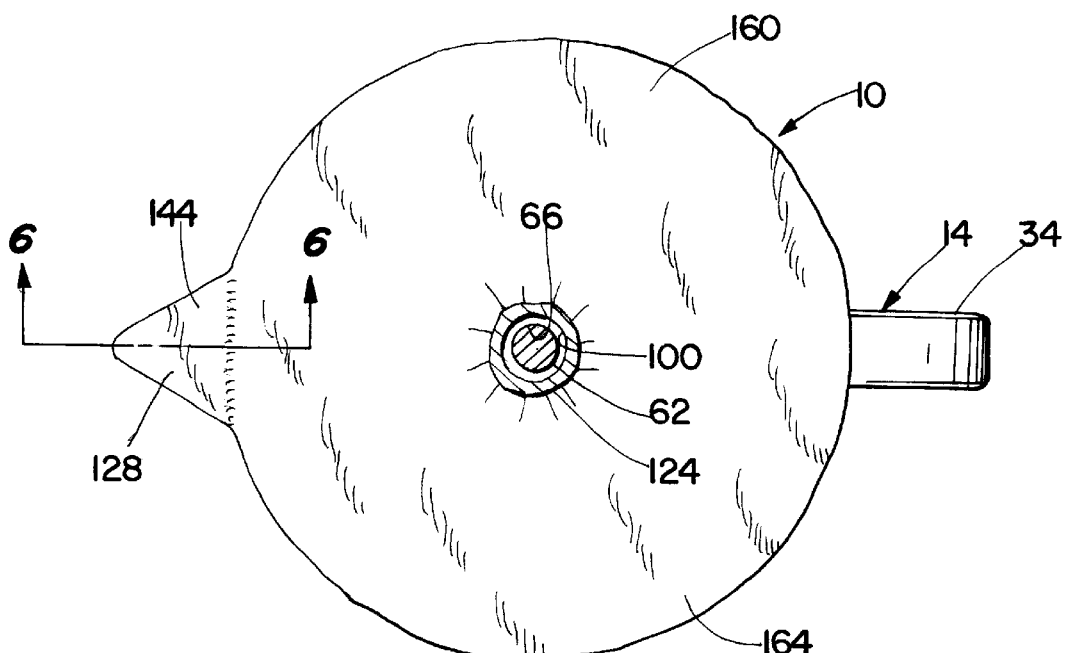
FIG. 2 is a plan view of the central opening in the top end of the jacket of the FIG. 1 embodiment.

FIG. 1 and 2 illustrate an insulating jacket 10 for a coffee press 14. A coffee press 14 comprises a heat resistant pitcher 18 with a cylindrical inner surface 22, a closed base 26, a spout 30, a handle 34 and a lid 38 fitting the pitcher 18. The lid 38 includes a plunger 42 having a fine mesh screen 46 at the bottom end 50 and a handle 54 at the top end 58. The plunger 42 is operated by a plunger rod 62 passing through an orifice 66 in the jacket 10 to separate brewed coffee 70 from coffee grounds 74 at the base 26 of the pitcher 18.

The jacket 10 is formed of insulating material 78 shaped to conform roughly to the exterior shape of the coffee press 14. The jacket 10 has a roughly cylindrical shape with an upper perimeter 82 and a lower perimeter 86 and has a closure 90 at its upper perimeter 82 forming a top end 94. The top end 94 of the jacket 10 includes a central hole 100 sized and located to accommodate the plunger rod 62 of the coffee press 14.

The jacket 10 includes a handle opening 104 and a spout opening 108 for the pitcher 18. Means 112 are provided for removably covering the spout 30 of the coffee press 14 and means 116 are provided for insulating the base 26 of the pitcher 18.

FIG. 5 illustrates a means 120 for opening and closing the jacket 10 about the opening 104 for the handle so as to prevent heat loss through the opening 104. This means 120 also provides a method to determine the level of coffee 70 remaining in the coffee press 14.

FIGS. 1 and 2 illustrate the central hole 100 in the top end 94 of the jacket 10 surrounded by elastic material 124 permitting the central hole 100 to be tightly closed about the plunger rod 62 of the lid 38.

FIGS. 1, 2, 6 and 7 show the means 112 for removably covering the spout 30 of the pitcher 18 which includes a flap 128 shaped to cover the spout 30 of the pitcher 18. The flap 128 is hingedly attached to the top end 94 of the jacket 10 at its upper perimeter 82. The flap 128 has a top surface 132 and a bottom surface 136 with the bottom surface 136 located on an upper edge 140 of the spout 30. The bottom surface 136 of the flap 128 is formed of a nonporous, heat resistant material.

When the coffee press 14 is positioned vertically on its base 26 the flap 128 rests on the upper edge 140 of the spout 30, thereby closing the spout 30 and preserving heat within the coffee press 14. When the coffee press 14 is tilted to pour coffee 70 from the pitcher 18 the flap 128 will be displaced upwardly away from the spout 30 by the weight of coffee 70 leaving the pitcher 18. The top surface 132 of the flap 128 may be formed of insulating material 144.

FIG. 7 illustrates a variant of the jacket 10 in which a strip of lightly magnetized material 148 is affixed to the jacket 10 adjacent an upper edge 140 of the spout 30 and the bottom surface 136 of the flap 128 is formed of material 152 which may be attracted by a magnet. When the coffee press 14 is positioned vertically on its base 26 the flap 128 rests upon the upper edge 140 of the spout 30 and the flap 128 is held in place by magnetic attraction, thereby closing the spout 30 and preserving heat within the coffee press 10. When the coffee press 14 is tilted to pour coffee 70 from the pitcher 18, the flap 128 will be displaced upwardly away from the spout 30 by the weight of coffee 70 leaving the pitcher 18 with sufficient force to separate the flap 128 from the upper edge 140 of the spout 30 despite the magnetic force attracting the flap 128 to the magnetized strip 148.

As shown in FIG. 3, a heat-reflecting metallic inner surface 152 is applied to the jacket 10 for maximizing heat retention and a stain-resistant coating 156 is applied to an outer surface 160 of the jacket 10. As illustrated in FIGS. 1 and 3, a pad of insulating material disposed below the base of the coffee press 14 and hingedly attached to the lower perimeter 86 of the jacket 10.

The insulating jacket for press-type coffee maker 10 has been described with reference to a particular embodiment. However, it should be obvious to those skilled in the art to which the invention pertains that other modifications and enhancements can be made without departing from the spirit and scope of the claims that follow.

We claim:

1. An insulating jacket for a coffee press comprising a heat resistant pitcher with a cylindrical inner surface, a closed base, a spout, a handle, a lid fitting the pitcher and a plunger having a fine mesh screen at the bottom end and a handle at the top end, the plunger being operated by a plunger rod passing through an orifice in the lid to separate brewed coffee from coffee grounds in the bottom of the pitcher, said jacket comprising:

a fitted sleeve formed of insulating material, said sleeve being shaped to conform roughly to the exterior shape of the pitcher;

said sleeve including openings to accommodate the handle and the spout of the pitcher;

an insulating top cover attached to said sleeve at an upper perimeter thereof, said top cover being sized to enclose the lid of the pitcher;

said top cover including a central hole, said central hole being sized and located to accommodate the plunger rod of the lid; and a means for removably covering the spout of the pitcher.

2. An insulating jacket for a coffee press comprising a heat resistant pitcher with a cylindrical inner surface, a closed base, a spout, a handle, a cover fitting the pitcher and a plunger having a fine mesh screen at the bottom end and a handle at the top end, the plunger being operated by a plunger rod passing through an orifice in the cover to separate brewed coffee from coffee grounds in the bottom of the pitcher, said jacket comprising:

insulating material shaped to conform roughly to the exterior shape of the coffee press;

said material having a roughly cylindrical shape and having an upper perimeter and a lower perimeter and having a closure at its upper perimeter forming a top end;

said top end including a central hole, said central hole being sized and located to accommodate the plunger rod of the lid;

said jacket including openings to accommodate the handle and the spout of the pitcher;

a means for removably covering the spout of the pitcher; and a means for insulating the base of the coffee press.

3. An insulating jacket for a coffee press as described in claim 2, further comprising:

a means for opening and closing the jacket about the opening for the handle so as to prevent heat loss through the opening; and said opening and closing means providing a means to determine the level of coffee in the pitcher.

4. An insulating jacket for a coffee press as described in claim 2 wherein the opening in the top end of the jacket is surrounded by elastic material so that the opening may be tightly closed about the plunger rod of the coffee press.

5. An insulating jacket for a coffee press as described in claim 2 wherein the means for removably covering the spout of the pitcher further comprises:

a flap shaped to cover the spout of the pitcher, said flap being hingedly attached to the top end of the jacket;

said flap having a top surface and a bottom surface, said bottom surface disposed upon an upper edge of the spout;

said bottom surface being formed of a non-porous, heat resistant material; and wherein, when the coffee press is positioned vertically on its base the flap rests upon the upper edge of the spout, thereby closing the spout and preserving heat within the coffee press, and when the coffee press is tilted to pour coffee from the pitcher, the flap will be displaced upwardly away from the spout by the weight of coffee leaving the pitcher.

6. A means for removably covering the spout of the coffee press as described in claim 5 wherein the top surface of the flap is formed of insulating material.

7. A means for removably covering the spout of the coffee press as described in claim 5, further comprising:

a strip of lightly magnetized material affixed to the jacket adjacent the upper edge of the spout;

said bottom surface of the flap being formed of material which may be attracted by a magnet; and wherein, when the coffee press is positioned vertically on its base the flap rests upon the upper edge of the spout, said flap being held in place by magnetic attraction, thereby closing the spout and preserving heat within the coffee press, and when the coffee press is tilted to pour a coffee from the pitcher, the flap will be displaced upwardly away from the spout by the weight of coffee leaving the pitcher with sufficient force to separate the flap from the top edge of the spout despite the magnetic force attracting the flap to the magnetic strip.

8. An insulating jacket for a coffee press as described in claim 2 further comprising a heat-reflecting metallic inner surface for maximizing heat retention.

9. An insulating jacket for a coffee press as described in claim 2 further comprising a stain-resistant coating for an outer surface of the jacket.

10. An insulating jacket for a coffee press as described in claim 2 further comprising a pad of insulating material disposed below the base of the coffee press and hingedly attached to the lower perimeter of the jacket.

* * * * *